Jan. 1, 1946. J. J. PALOTSEE 2,392,259
MANDREL
Filed Jan. 15, 1945
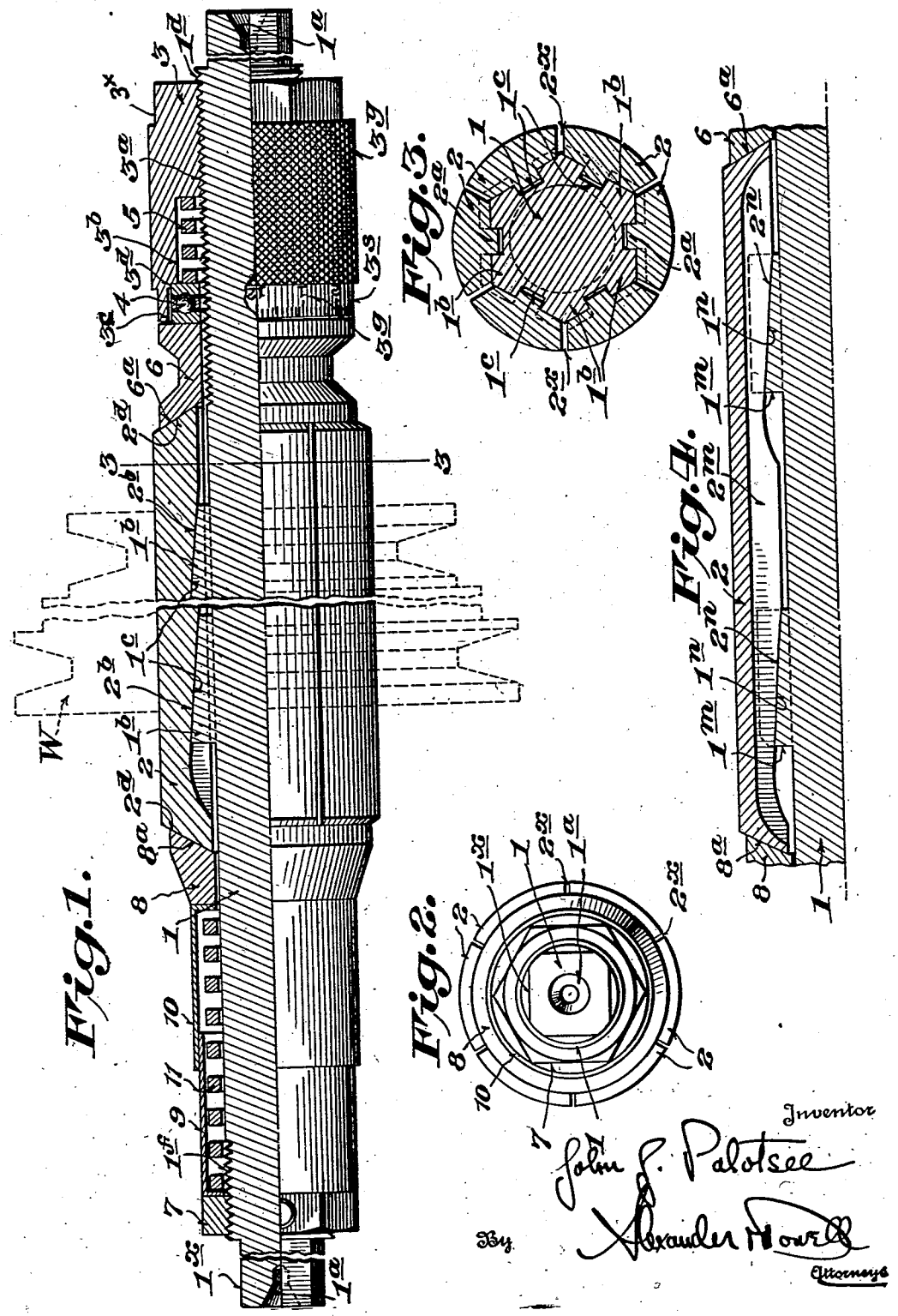

Patented Jan. 1, 1946

2,392,259

UNITED STATES PATENT OFFICE 2,392,259

MANDREL

John J. Palotsee, Youngstown, Ohio

Application January 15, 1945, Serial No. 572,820

10 Claims. (Cl. 51—227)

This invention is a novel mandrel for holding work which is to be ground, turned down, or polished in a lathe or other machine, and the principal object thereof is to provide a mandrel which is simple in construction and efficient in operation and is of adjustable diameter to hold the piece of work, such as a pulley or the like having an axial bore through which the mandrel is inserted, and the mandrel then expanded to frictionally bind against the walls of the bore of the work so as to cause the work to be supported by and rotated with the mandrel.

Other minor objects of the invention will be hereinafter set forth.

I will explain the invention with reference to the accompanying drawing which illustrates several practical embodiments thereof, to enable others familiar with the art to adopt and use the same; and will summarize in the claims the novel features of construction, and novel combinations of parts, for which protection is desired.

In said drawing:

Fig. 1 is an elevation, partly in section, through one modification of the mandrel, showing in dotted lines a piece of work operatively mounted thereon.

Fig. 2 is an elevation of the mandrel, looking at the chuck end.

Fig. 3 is a transverse section on the line 3—3, Fig. 1.

Fig. 4 is a detail sectional view showing a modification.

As shown in Figs. 1-3 inclusive, the mandrel comprises a main shaft 1, preferably solid and of desired length, having at both ends countersunk axial holes 1a whereby the same may be mounted in the center pins of the heads of a lathe or other machine, at least one end of the shaft 1 having a non-circular portion 1x (Figs. 1 and 2) for engagement with the chuck or other element of the lathe or machine, whereby shaft 1 will be rotated with the head while same is centered by the countersunk holes 1a.

Adjacent the center of the shaft 1, as shown in Figs. 1 and 3, are a spaced series of enlargements 1b preferably of hexagonal or other polygonal shape having their outer faces inclined in the same direction as shown, each enlargement 1b being of substantial length and having an axially disposed groove 1c in its outer inclined face of substantial width for the purpose hereinafter set forth. The enlargements 1b are preferably formed integrally with the shaft 1 but may be formed separately and secured thereto in any desired manner.

Disposed upon and around the enlargements 1b are blades 2 of length sufficient to embrace the enlargements 1b, six such blades 2 having their inner faces substantially corresponding in width with that of the outer faces of the hexagonal enlargements 1b being shown in Fig. 3, said blades being provided with integral fins 2a on their inner faces slidably engaging the axial grooves 1c in the enlargements 1b, the adjacent inner faces of the blades being inclined as at 2b (Fig. 1) and conforming with the slope or inclination of the outer faces of the enlargements 1b, so that as the blades 2 are shifted axially of shaft 1 the blades will be moved radially outwardly or inwardly with respect to said shaft. Each blade 2 is beveled as at 2d at its ends for the purpose hereinafter described. Preferably the outer face of each blade 2 is arcuate, as shown in Fig. 3, whereby the assembled blades when fully contracted around the shaft will form a substantial cylindrical work engaging surface, the sides of the blades 2 being slightly spaced apart as at 2x, Fig. 3, when the blades are fully contracted.

The end of shaft 1 opposite from the mandrel engaging portion 1x is exteriorly threaded as at 1d; and threaded thereon is a nut 3 having an axial bore 3a which is tapped to engage the threads 1d. The bore of nut 3 is provided at its inner end with an axial enlargement 3b, Fig. 1, and is provided with a non-circular external portion 3x at its outer end whereby the nut may be readily turned on the shaft 1 by means of a wrench or the like. Nut 3 is also provided with a knurled exterior 3y extending throughout the major portion of its length to facilitate hand turning of the nut. At the outer end of the enlarged bore 3b of the nut is a further enlarged bore 3c forming with the bore 3b a shoulder 3d, and a ball bearing 4 is housed in the enlarged bore 3c with its inner race normally engaging the shoulder 3d, its outer race extending slightly beyond the end of bore 3c as indicated in Fig. 1. Within the bore 3b between the inner race of bearing 4 and the inner end of the bore 3b is a coiled spring 5 under compression and adapted to yieldably urge the bearing 4 out of the nut 3 toward the adjacent end of the assembled blades 2.

Around the shaft 1 between the bearing 4 and the adjacent end of the assembled blades 2 is a collar 6 having its outer end engaging the outer race of the ball bearing 4 and its inner end beveled as at 6a corresponding with the bevel 2d of the adjacent ends of the assembled blades 2.

whereby the adjacent ends of blades 2 will be retained in position upon the hexagonal enlargements 1b of shaft 1.

Preferably the end of nut 3 adjacent collar 6 is reduced in diameter as at 3s, Fig. 1, and is provided with an annular series of graduations 3g cooperating with a zero mark (not shown) upon the collar 6 whereby the nut 3 may be visually adjusted for small increments of enlargement or decrease in the overall diameter of the assembled blades 2.

The opposite end of shaft 1 is likewise threaded as at 1f and carries a nut 7, Fig. 1, adjustable axially of the shaft. A collar 8 is mounted on the shaft 1, having a beveled end 8a corresponding with and engaging the adjacent beveled ends 2d of the assembled blades 2 as shown in Fig. 1, to maintain the adjacent ends of the assembled blades on the hexagonal enlargements 1b of shaft 1. Between the collar 8 and nut 7 are telescoping housings 9—10 of diameter somewhat larger than shaft 1 and having ends containing the nut 7 and collar 8 respectively. Within the housings 9—10 around shaft 1 is a coiled spring 11 under compression and normally urging the collar 8 and assembled blades 2 toward the collar 6 at the opposite end of the blade assembly.

By the above construction, the blades 2 are axially slidably mounted upon shaft 1 and are yieldably retained in adjustable position thereon by the collars 6 and 8, the adjustment in overall diameter being effected by rotation of the nut 3, the degree of compression of the blades between collars 6 and 8 being adjusted by rotation of nut 7. As the nut 3 is rotated in one direction the parts 6, 2 and 8 will be urged toward the nut 7 to increase the diameter of the mandrel, and when the nut 3 is rotated in the opposite direction the parts 6, 2 and 8 will move away from the nut 7, thereby effecting a decrease in the effective diameter of the assembled blades 2. As the blades 2 are shifted in either direction, the inclined surfaces 2b ride upon the inclined surfaces of the enlargements 1b guided by the fins 2a of the blades engaged in the slots 1c in the enlargements, causing the assembled blades to simultaneously move radially towards or from the axis of shaft 1. The blades 2 however are always yieldably held in adjusted position by reason of the action of the opposed coiled springs 5 and 11. Thus when the blade assembly is sufficiently reduced in diameter, the mandrel may be inserted through the bore of the work W, shown in dotted lines in Fig. 1, and thereafter by rotating the screw 3 on shaft 1 in the proper direction the blade assembly will be increased in effective diameter to frictionally engage the bore of work W, thereby effectively mounting the work thereon. Thereafter, the assembled work and mandrel may be placed in the lathe with the lathe chuck applied to the non-circular portion 1x of the shaft.

In Fig. 4 a modification of the means for mounting the blades 2 on the shaft 1 is shown. In this modification the shaft 1, instead of being provided with spaced series of enlargements 1b, is provided with spaced annular series of enlargements 1m having inclined slots 1n disposed axially thereof, as shown, said slots 1n of both series being inclined in the same direction. The undersides of the blades 2 are provided with axially disposed fins 2m extending from end to end, said fins having correspondingly inclined inner faces 2n in engagement with the inclined bottoms of the slots 1n of enlargements 1m of shaft 1, said fins 2m being of width equal to the width of slots 1n. Thus the blades 2 in Fig. 4, when shifted axially of the shaft, will be moved simultaneously radially inwardly or outwardly with respect to the axis of the shaft by reason of the engagement of the inclined surfaces 2n and 1n of the blades and the enlargements.

I do not limit my invention to the exact forms shown in the drawing, for obviously changes may be made therein within the scope of the claims.

I claim:

1. A mandrel, comprising a shaft having countersunk end holes and having a non-circular chuck engaging portion adjacent one end; spaced annular enlargements on the shaft intermediate its ends having outer portions inclined in the same direction, and having aligned slots therein; a plurality of longitudinally disposed blades around the shaft embracing the enlargements, each having a rib on its underside slidably mounted in aligned slots; said blades having portions inclined in the same direction as and seating upon the corresponding inclined portions of the enlargements; the ends of the blades being beveled in opposite directions; a collar axially movable on the shaft at one end of the blades and having a conical bore receiving the adjacent beveled ends of the blades; an adjustable member on said shaft engaging the collar; a second collar axially movable on the shaft at the opposed end of the blades and having a conical bore receiving the adjacent beveled ends of the blades; a second member on the shaft beyond the second collar; and yieldable means around the shaft interposed between the second collar and second member.

2. In a mandrel as set forth in claim 1, said yieldable means comprising a coiled spring around the shaft; and telescoping housing sections embracing the ends of the spring and disposed around the shaft.

3. In a mandrel as set forth in claim 1, said first member having a tapped bore threaded on the shaft; and an annular graduated scale on the member adjacent the first collar cooperating with a "zero" mark on the said collar.

4. A mandrel, comprising a shaft having countersunk end holes and having a non-circular chuck engaging portion adjacent one end; spaced annular enlargements on the shaft intermediate its ends having outer portions inclined in the same direction, and having aligned slots therein; a plurality of longitudinally disposed blades around the shaft embracing the enlargements each having a rib on its underside slidably mounted in aligned slots; said blades having portions inclined in the same direction as and seating upon the corresponding inclined portions of the enlargements; the ends of the blades being beveled in opposite directions; a collar axially movable on the shaft at one end of the blades and having a conical bore receiving the adjacent beveled ends of the blades; a nut threaded on said shaft beyond the collar; antifriction means interposed between the nut and collar; a second collar axially movable on the shaft at the opposed end of the blades and having a conical bore receiving the adjacent beveled ends of the blades; a second nut threaded on the shaft beyond the second collar; and yieldable means around the shaft interposed between the second collar and second nut.

5. In a mandrel as set forth in claim 4, said yieldable means comprising a coiled spring around the shaft; and telescoping housing sections embracing the ends of the spring and disposed around the shaft.

6. In a mandrel as set forth in claim 4, said first nut having a tapped bore threaded on the shaft, and having an enlarged bore at its inner end receiving the antifriction means; said enlarged bore being of less length than the antifriction means; and said antifriction means comprising a ball bearing.

7. In a mandrel as set forth in claim 4, said first nut having a tapped bore threaded on the shaft, and having an enlarged bore at its inner end receiving the antifriction means, said enlarged bore being of less length than the antifriction means; an intermediate bore communicating with the enlarged bore; and a coiled compressed spring within the intermediate bore around the shaft having its ends engaging the antifriction means and the inner end of the intermediate bore for normally urging the antifriction means towards the blades.

8. A mandrel, comprising a shaft having countersunk end holes and having a non-circular chuck engaging portion adjacent one end; inclined surfaces on the shaft intermediate the ends sloping in the same direction; a plurality of longitudinally disposed blades around the shaft embracing the cam surfaces and having inclined surfaces sloping in the same direction as and seating upon the corresponding inclined surfaces of the enlargements; the ends of the blades being beveled in opposite directions; a collar axially movable on the shaft at one end of the blades and having a conical bore receiving the adjacent beveled ends of the blades; a nut threaded on said shaft beyond the collar having an enlarged bore at its inner end; antifriction means within said enlarged bore interposed between the nut and collar; said enlarged bore being of less length than the antifriction means; a second collar axially movable on the shaft at the opposed end of the blades and having a conical bore receiving the adjacent beveled ends of the blades; a second nut threaded on the shaft beyond the second nut; and yieldable means around the shaft interposed between the second collar and second nut.

9. In a mandrel as set forth in claim 8, an intermediate bore in the first nut communicating with the enlarged bore; and a coiled compressed spring within the intermediate bore around the shaft having its ends engaging the antifriction means and the inner end of the intermediate bore for normally urging the antifriction means towards the blades.

10. In a mandrel as set forth in claim 8, said yieldable means comprising a coiled spring around the shaft; and telescoping housing sections embracing the ends of the spring and disposed around the shaft.

JOHN J. PALOTSEE.